United States Patent [19]

Aldridge et al.

[11] 4,038,535

[45] July 26, 1977

[54] CALCULATOR-PRINT CRADLE SYSTEM

[75] Inventors: Bruce E. Aldridge, Dallas; Michael J. Cochran, Richardson; Lee G. Kitchens, Richardson; Robert R. Kressler, Richardson; Stephen P. Hamilton, Garland, all of Tex.

[73] Assignee: Texas Instruments Incorporated, Dallas, Tex.

[21] Appl. No.: 646,463

[22] Filed: Jan. 5, 1976

[51] Int. Cl.² ............................................. G06F 15/02
[52] U.S. Cl. .................................... 235/152; 364/900
[58] Field of Search ........................... 235/152, 156; 340/172.5

[56] References Cited
U.S. PATENT DOCUMENTS

| 3,819,921 | 12/1972 | Kilby et al. ........................ 235/156 |
| 3,823,388 | 7/1974 | Chadima, Jr. et al. ............. 340/172.5 |
| 3,900,722 | 8/1975 | Cochran et al. .................... 235/152 |
| 3,909,626 | 9/1975 | Balasubrananian et al. ....... 235/156 |
| 3,940,742 | 2/1976 | Hudspeth et al. ................. 340/172.5 |
| 3,971,925 | 7/1976 | Wenninger et al. ................ 235/156 |

Primary Examiner—David H. Malzahn
Attorney, Agent, or Firm—Harold Levine; Rene' E. Grossman; Richard P. Berg

[57] ABSTRACT

This invention relates to enhancement of calculator versatility through connections provided in a calculator cradle leading to a printing mechanism therein when a calculator is nested in the cradle. In a more specific aspect, the invention relates to the communication between a calculator and a printer module which nests the calculator and responds to instructions and data flow from the calculator to print selected calculator information.

10 Claims, 11 Drawing Figures

CALCULATOR-PRINT CRADLE SYSTEM

Electronic desk top calculators and compact hand-held calculators are now readily available at low cost primarily because of advances in semiconductor technology. Availability of MOS/LSI chips and other semiconductors has permitted the development of desk and hand calculators with capabilities far beyond those of previous calculator generations.

In U.S. Pat. No. 3,900,722 which was granted on Aug. 19, 1975 to Michael J. Cochran and Charles P. Grant, a chip calculator is disclosed in detail wherein there is provided a numeric display of the calculator results and functions. Such calculators are currently manufactured and sold by Texas Instruments Incorporated of Dallas, Texas.

In application Ser. No. 428,492, filed Dec. 26, 1973, there is disclosed a self-contained, or integral, printer unit including an auxiliary MOS/LSI chip which utilizes function and data signals from the arithmetic, logic and memory units, along with control and timing signals to activate a thermal printer. In accordance therewith, thermally sensitive paper is stepped past a printhead in coordination with the operation of the chip to provide printout of the calculator results rather than or in addition to a mere display thereof.

In accordance with the present invention, the printer integrated circuit chip operates to generate its own internal commands and is mounted in a cradle which contains a thermal printhead. Serial data streams and print commands are exchanged between a nested calculator and the cradle for the selective energization of the thermal print elements.

More particularly, in one aspect of the invention a portable electronic calculator is implemented with one or a few integrated circuit semiconductor chips with means therein for entering both data and functions. A printer cradle receives the calculator in the nest having a set of contacts for coupling electrically the calculator to the cradle when inserted therein. Means including at least one integrated circuit semiconductor chip in the cradle exchanges control signals with the calculator and receives data for actuating the printer.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, wherein:

Figure 1:
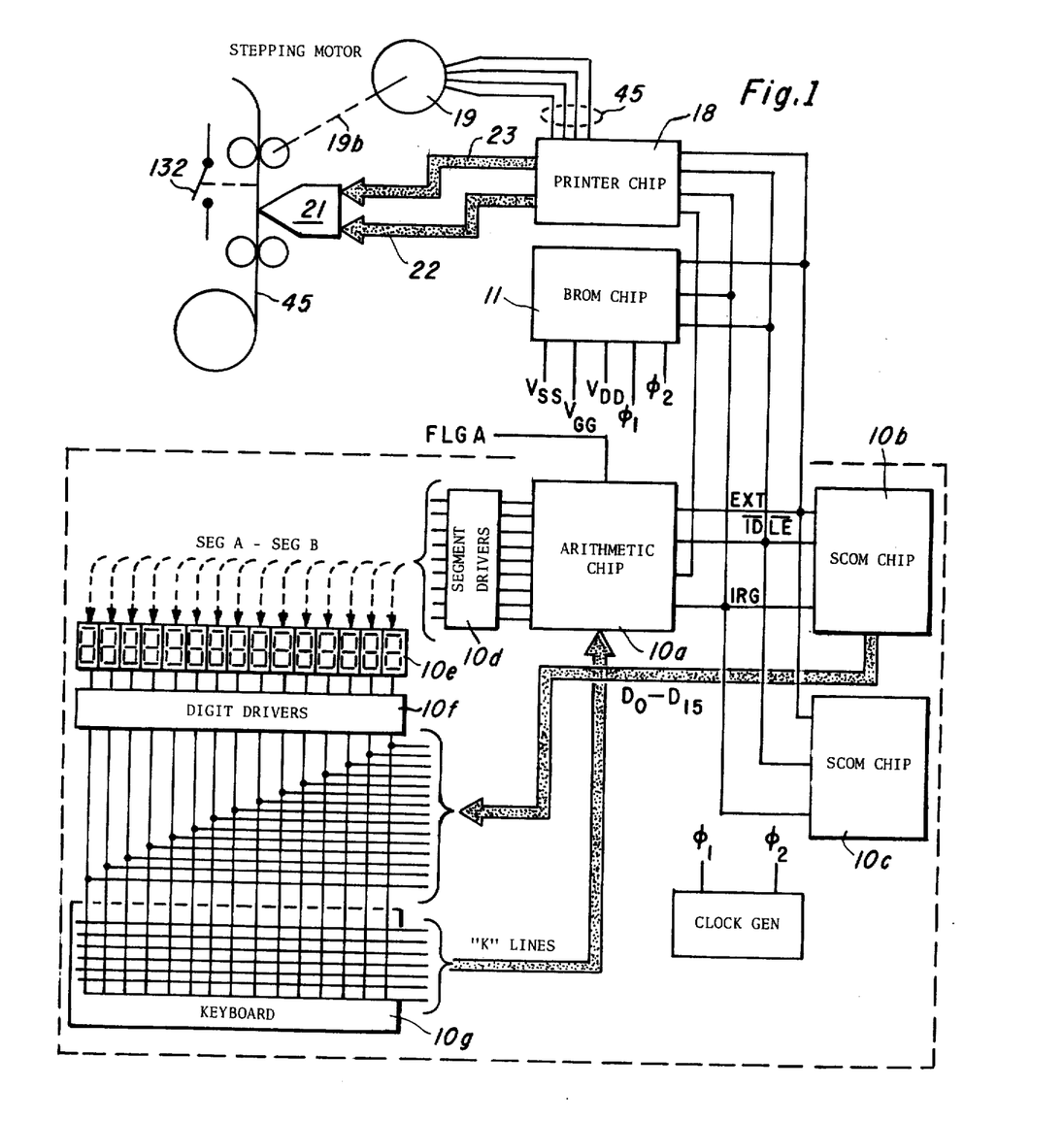
FIG. 1 is a simplified block diagram of a calculator system illustrating application of the invention.

Within the dashed lines of FIG. 1, there is illustrated in functional block diagram form a multichip calculator 10 employing the present invention.

Calculator 10 of FIG. 1 is described in detail in U.S. Pat. No. 3,900,722 granted to Michael J. Cochran and Charles P. Grant on Aug. 19, 1975. This calculator is identified as Texas Instruments' SR-51 Scientific Calculator. Briefly, calculator 10 includes an arithmetic chip 10a and 2 SCOMS (scanning and read only memory) chips 10b and 10c interconnected with a peripheral printer chip 18 and bare read only memory (BROM) 11. Chip 18 is also connected to a motor 19 to step paper past printhead 21.

Arithmetic chip 10a is connected to a set of segment drivers 10d which serve to control a multi-element display 10e. The output of SCOM chip 10b is connected by way of D-lines to a digit driver unit 10f as well as to a keyboard 10g. A set of K-lines connect the output of keyboard 10k to arithmetic chip 10a.

The heart of calculator 10 as described in the above-identified U.S. Pat. No. 3,900,722 is comprised of the arithmetic chip 10a and the SCOM chips 10b and 10c. Arithmetic chip 10a generates a plurality of control signals which are applied: (a) to SCOM chips 10b and 10c; (b) to an external bare read only memory (BROM) chip 11; and (c) to printer chip 18 to provide for controlling an output printer of the thermal printer type.

While the above-identified U.S. Pat. No. 3,900,722 describes calculator 10 in detail, briefly, the control signals generated by the arithmetic chip 10a include the following:

Arithmetic chip 10a, FIG. 1, provides output data information from its internal Registers B and/or A and Flag Register A to segment drivers 10d. Information which is provided includes: position of the comma, position of the decimal point, actual data results to be displayed from the "B" and/or "A" register and data to be displayed from the Flag A register. The segment drivers 10d comprise conventional driver circuits for actuating displays 10e which are shown to have a seven segment display plus decimal point per digit, with one digit actuated per D time. Thus for a 16 digit display in scientific notation driven by 16 D times, there are up to 14 digits in the mantissa, 2 digits for the exponent, with 2 digits utilized as annotators for the mantissa and exponent being strobed nonexclusively.

SCOM chip 10b provides the D times to the digit driver 10d for selectively scanning in sequence the digits of the display 10e and keyboard 10g. Scanning of the display 10e is explained in detail in U.S. Pat. No. 3,892,957 granted on 1 July 1975 to John D. Bryant.

SCOM chips 10b and 10c are responsible to EXT and $\overline{IDLE}$ command signals from the arithmetic chip and generate in response thereto the D times, the instruction word $I_0$–$I_{12}$ IRG, and data from a constant ROM, all of which is communicated back to arithmetic chip 10a.

BROM chip 11 may be one of an expandable set of peripheral chips allowing expanded caculator capcity. BROM chip 11 is responsive to the EXT, IRG and $\overline{IDLE}$ commands from the arithmetic chip for providing a 1024 additional instruction word capacity per additional ROM chip.

The printer chip 18 is responsive to EXT $\overline{IDLE}$ and IRG commands from the arithmetic chip for printing in accordance with data on the EXT line. The BUSY command is sent from printer chip 18 to the arithmetic chip when the printer is in operation.

For minimizing pin count on the arithmetic and SCOM chips, and for maximizing silicon area utilization, both chips include separate timing generators for providing S and D times, with the timing generator on the SCOM chip dependent upon the arithmetic chip for synchronization. Furthermore, instead of providing separate signals on separate lines between chips representing various conditions of the arithmetic chip, such as flags and sync signal, as heretofore utilized in earlier multi-chip calculator systems. The multi-chip system disclosed in U.S. Pat. No. 3,900,722, features a multiplexed command signal from the arithmetic chip to the SCOM chip wherein each bit of a subset of bits in the command word represents the particular condition required to be transmitted. For example, the EXT signal communicated to the SCOM chip transmits a PREG, Program Register signal in the $S_0$ bit indicating that the SCOM chips are being addressed, transmits a second signal in the second bit at times $S_1$ for indicating the COND condition, and transmits the HOLD condition in the third bit at time $S_2$ indicating that the ROM address register is not to be incremented. Heretofore, three separate signals and pins were required for transmitting this information. Although the arithmetic chip 10 and the SCOM chip 10b provide a basic operating calculator system as disclosed in U.S. Pat. No. 3,900,722, the chip pair provides a basic system which accommodates peripheral storage and output function chips, perferably implemented in MOS/LSI utilizing novel methods of addressing for minimizing pin count.

The configuration and operation of printer control chip 18 are described in detail in the aforementioned patent application Ser. No. 428,492; and therefore in the present application reference is made only to those aspects which relate to the inventive features herein.

Figure 3A:
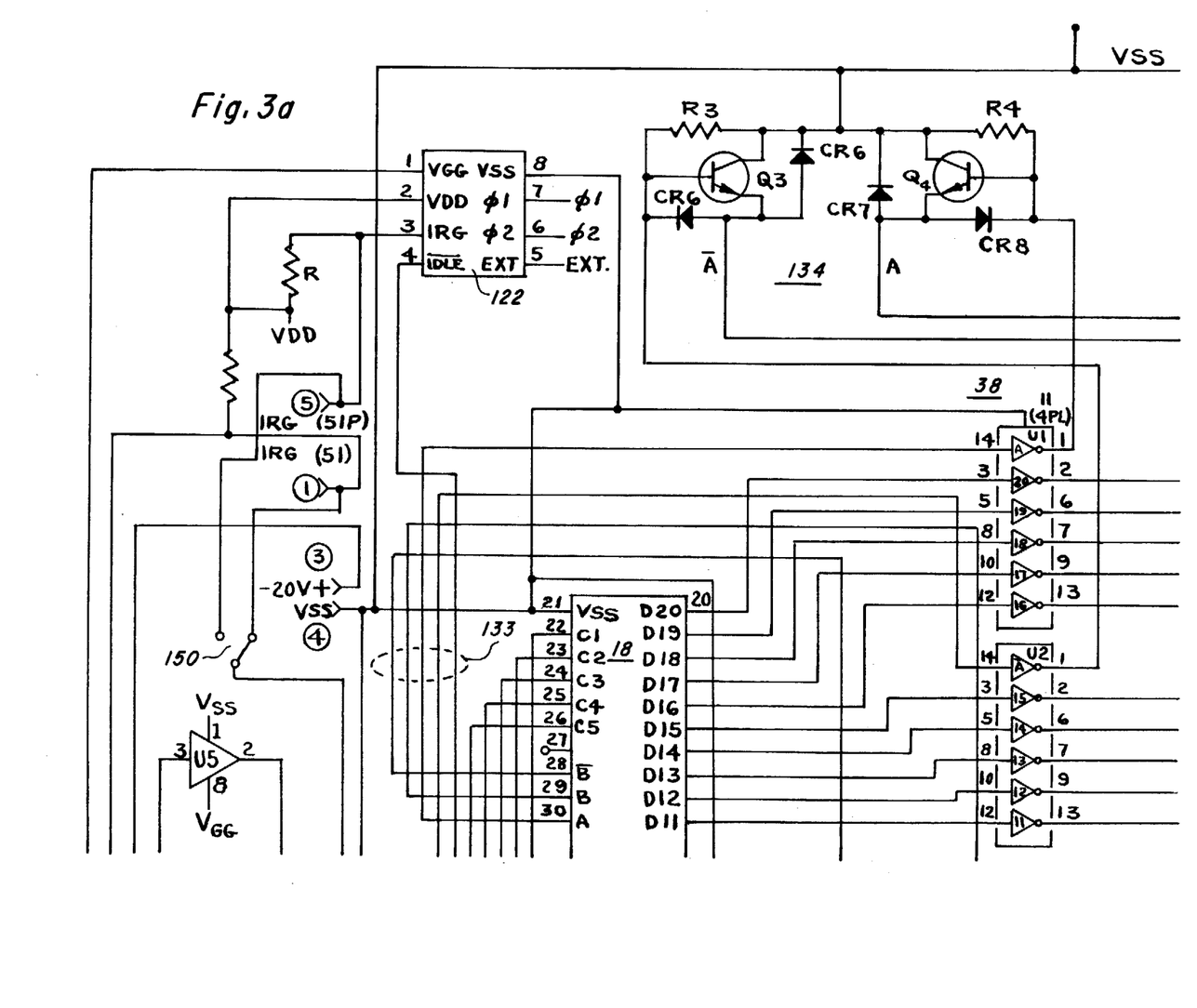
FIGS. 3a, 3b 3c and 3d are schematic diagrams of the circuits of the cradle.
Figure 3B:
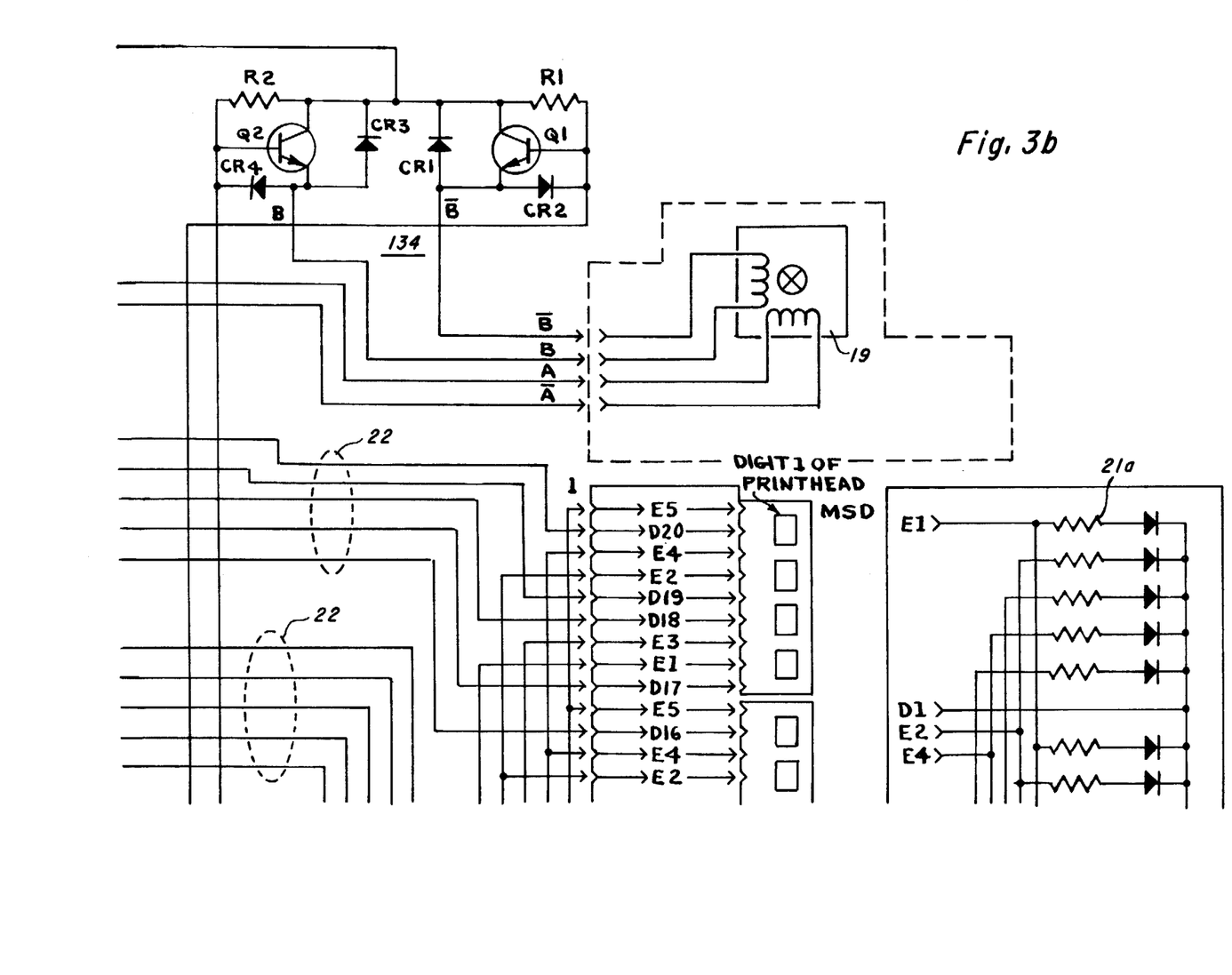
Figure 3C:
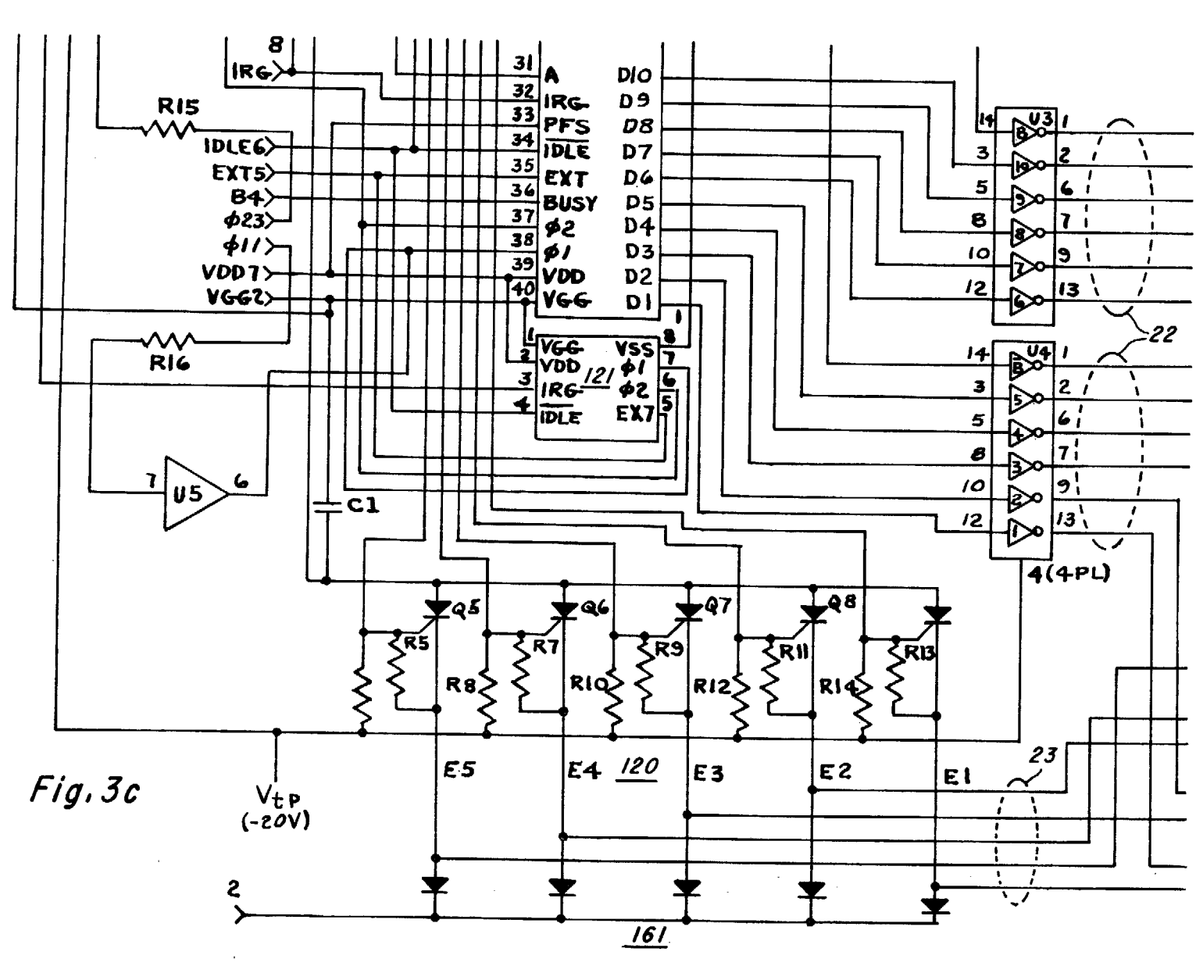
Figure 3D:
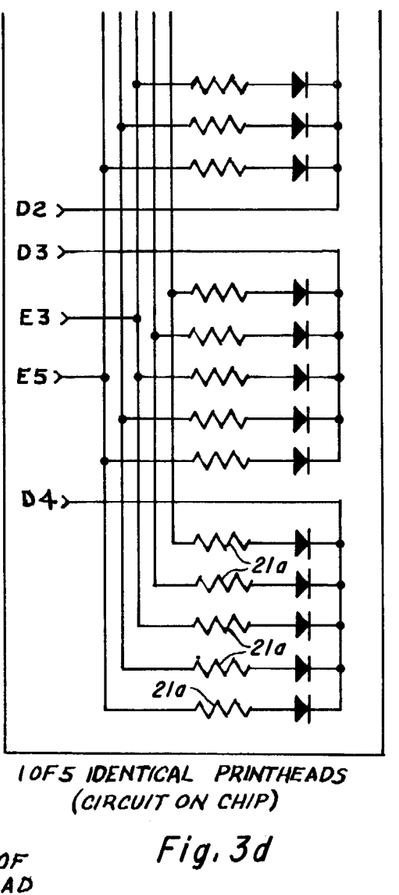

Components on chip 18 operate collectively to energize resistive-type heaters formed in the printhead 21. The printhead 21 comprises a linear array of 100 heaters 21a (FIG. 3d). Heaters 21a are arranged in sets of five. Collectively, twenty sets of five heaters per set span a thermally sensitive paper tape on which the output of calculator 10 is to be printed. For each character, the system prints a 5 × 7 matrix selectively one row at a time with the paper being stepped by a motor 19 (FIG. 3b) in the interval between printing of the successive rows. Each set of five heaters is spaced apart physically to provide space between printed characters. Twenty character strobe lines 22 are connected to printhead 21. Each of strobe lines 22 is connected to each of a set of five heater input terminals. Column strobe lines 23 are five in number and are individually connected to the first, second, third, fourth and fifth heaters, respectively, in each set. More particularly, line 23a is connected to the first heater in each of the twenty sets. Line 23b is connected to the second heater in each of the twenty sets. Lines 23c, 23d and 23e likewise are connected to the third, fourth and fifth heaters, respectively, in each of the 20 sets.

As described in the mentioned application, within chip 18 a data stream on line EXT is supplied to a function programmable logic array the output of which is stored in a sequential address memory (SAM). The SAM stores a six-bit word to designate by decoding each of 20 characters that are to be printed by the printhead 21. A read-only memory is provided to store a six-bit code for each of 64 alphanumeric characters capable of being printed by a printhead 21. A bus supplies the code from the SAM to the ROM to provide a one-in-64 decode. A general timing generator applied pulses to the ROM for a one-in-seven decode and for a one-in-five decode so that there is produced on an output line a serial binary code which is stored in an output shift register. When 20 bits are stored in the shift register representative of the locations of desired dots to be printed, selected heaters are energized to burn the thermally sensitive paper. The timing generator is also connected to a decoder to energize a five-line output bus.

Sync timing pulses on line IDLE are applied to a state time generator, the output of which is applied to a MATCH logic. The above mentioned general timing generator is also connected to the MATCH logic whose output is connected to the general timing generator for synchronizing the same and for control of the time relationships within the chip. An output bus is connected to a decoder to control lines which energize step motor 19. Motor 19 operates a mechanical linkage 19b to step thermally sensitive paper tape past the printhead 21.

Instruction words on line IRG are applied to an instruction decoder. The output of this decoder is applied to control logic which is connected to various elements throughout the system. Further details as to construction of chip 18 and the associated calculator are fully set out in the above-identified application.

Figure 4:
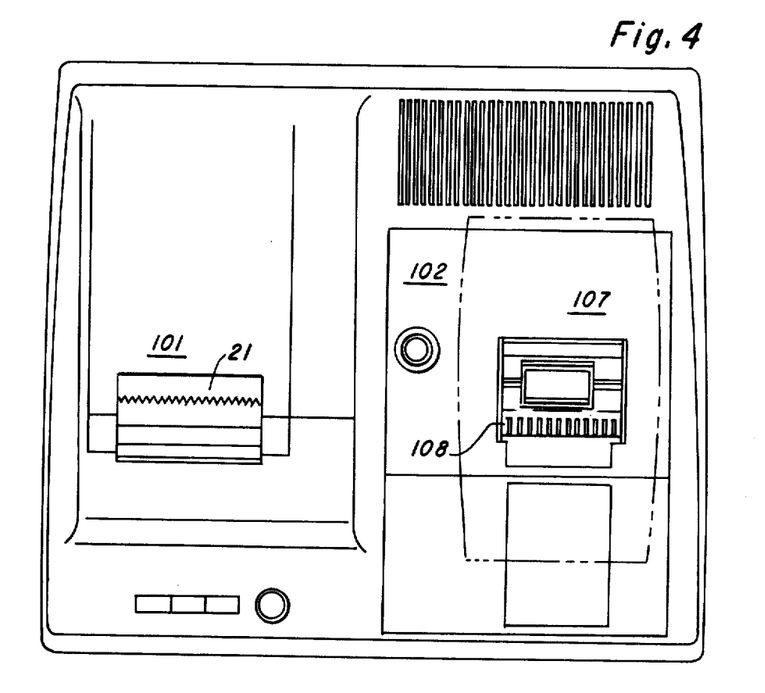
FIGS. 4, 5 and 6 are plan and elevation views of the cradle.
Figure 5:
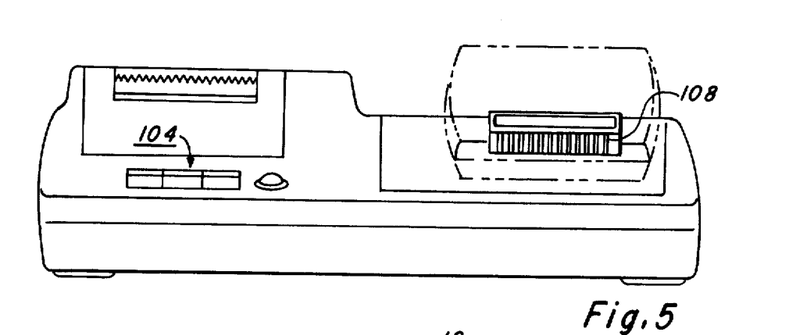
Figure 6:
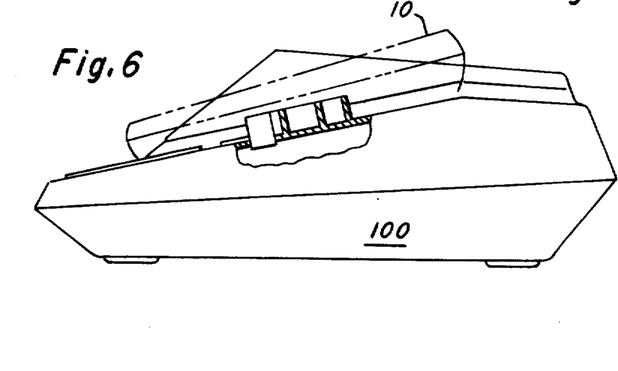

The present invention provides enhanced versatility for hand-held integrated circuit calculators not heretofore possible. This versatility is embodied in a calculator print out mechanism which may be used in conjunction with a hand-held calculator. One possible embodiment of such a print out mechanism is illustrated in FIGS. 4, 5 and 6. As illustrated, a hand-held calculator is connected to a desk console unit with a print out provision. The construction is such that the calculator can be removed from the console and transported independent thereof and used in the ordinary manner as a display only type of calculator.

The hand-held calculator is connected to the desk console by removing the cover to the battery compartment thereby exposing the batteries and an adjacent set of contacts. These contacts match up with a mating pair of contacts in the console unit.

The console or cradle 100 is provided with a printer section 101 and a calculator cradle section 102. The printer section holds a supply roll of paper which is threaded beneath the panel of section 101 to a thermal printer 21. The console includes such switches as an on-off switch, a paper drive switch, a print enable switch, and a trace mode switch. These switches may be mounted, for example, on the surface of the console in front of the printer section as exemplified by the switches 104.

The calculator section is provided with a depression or nest 107 into which a calculator may be inserted. In the bottom of the nest is a multichannel male plug 108. There are eleven contacts in the male element 108. A calculator is shown in outline illustrating how it may be connected to the console with the connections there between being automatically completed upon insertion of the calculator. This permits the user a capability beyond that of hand-held calculator.

Other specific embodiments of the console 100 may be provided. However, the essential aspect thereof is a printer capability in the console with a nest to receive a calculator and to interconnect the calculator with the printer and the console.

Figure 2A:
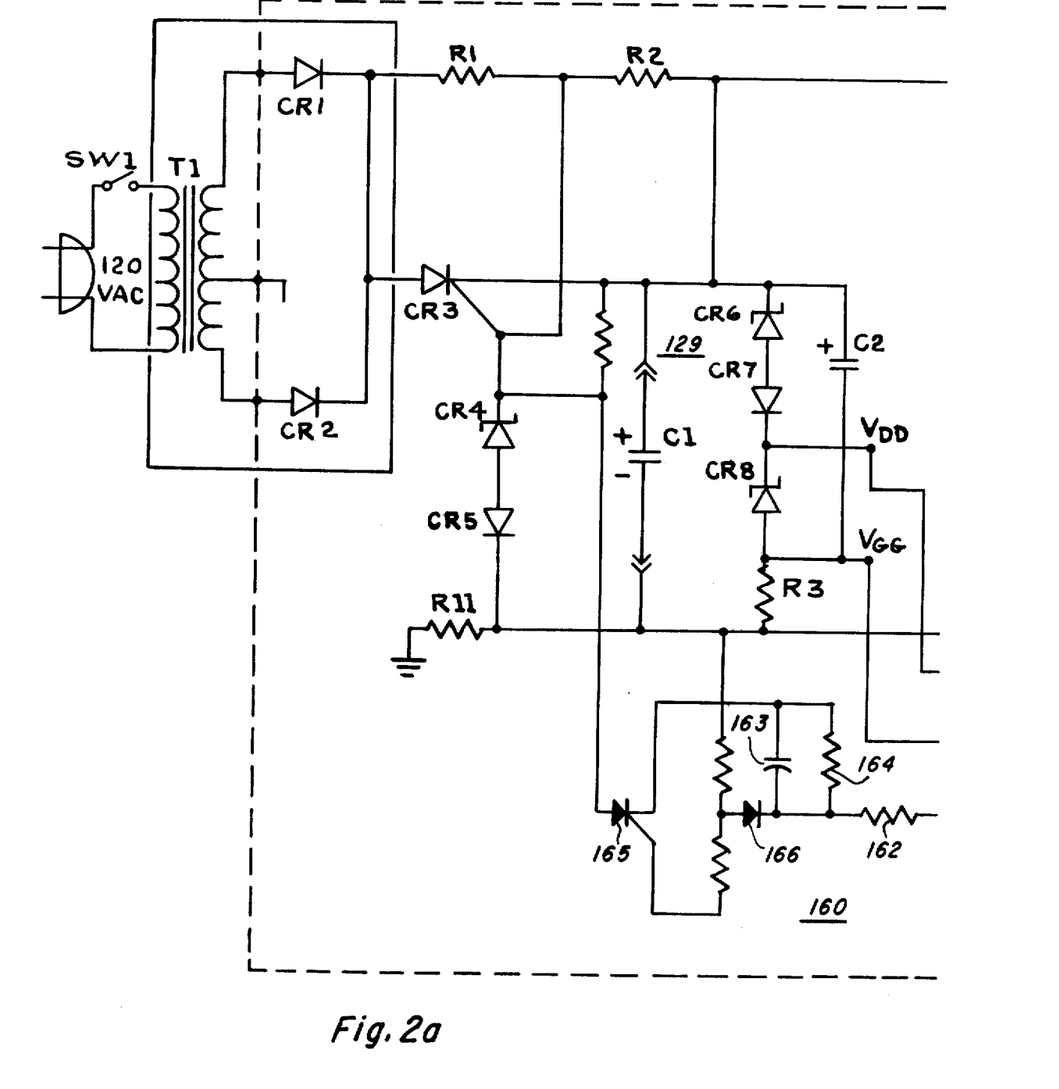
FIGS. 2a, 2b and 2c are diagrams of power supplies and certain interconnections for the circuits.
Figure 2B:
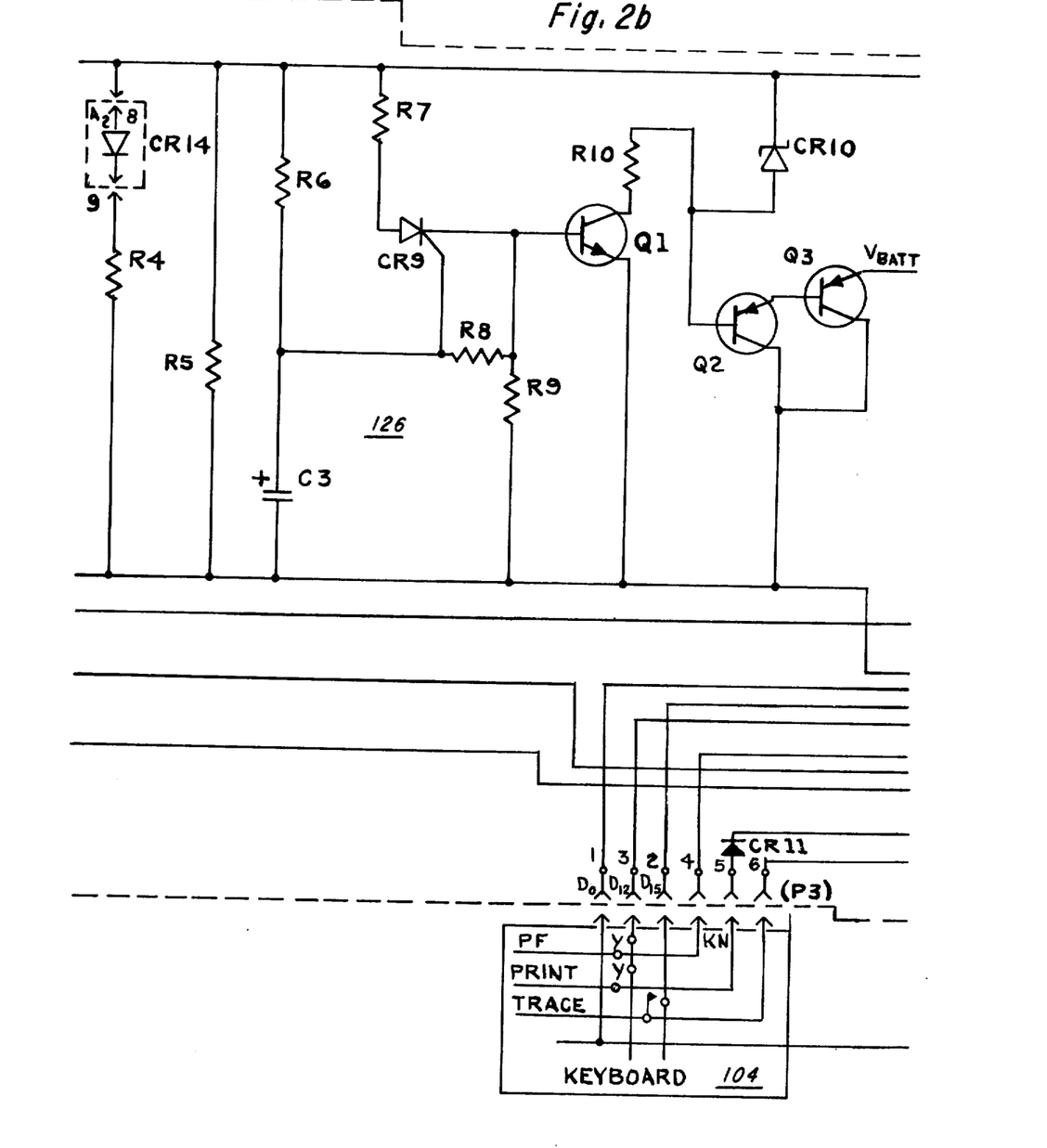
Figure 2C:
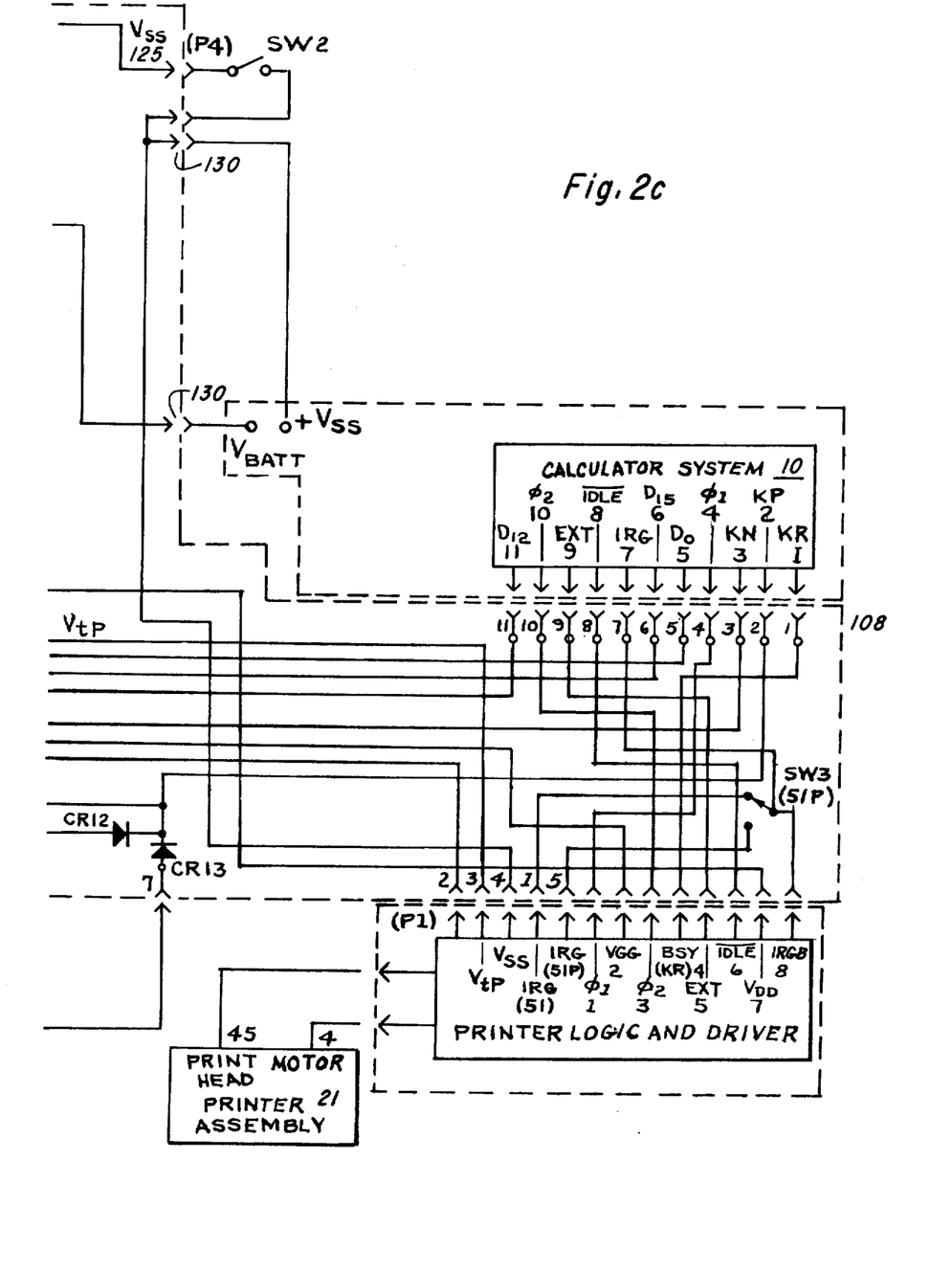

FIGS. 2a, 2b and 2c form a composite schematic diagram partially in block of those circuits in the console. The basic parts are the power supply 126, the printer logic and driver (designated individually as 18 and 121 in FIG. 3), the console keyboard and a printhead protection circuit 160. The hand-held calculator is illustrated as a calculator system 10.

FIGS. 3a, 3b, 3c and 3d illustrate in more detail the interconnection of the printer logic and driver 18 and 21 and the motor drive circuit 126.

In accordance with the invention, all the elements illustrated in FIGS. 2 and 3 are included in the cradle 100 of FIGS. 4–6. The thermal printer 21 comprises five modules. Each module includes twenty thermal elements and preferably are of the type manufactured and sold by Texas Instruments Incorporated, of Dallas, Texas, as thermal printhead EPN3100. The printheads 21 are energized by drive amplifiers 38 selectively under the control of priner chip 18 via channels 22. The other terminals of the printer modules are actuated by way of channels 23. The latter channels, the column drive, are driven by circuit 120 from terminals C1–C5 of chip 18. The circuit 120 serves to increase the current delivery to the printheads. The receptacle 108 is connected by way of $0_1$ and $0_2$ lines 37 and 38 to chip 18 as well as to a printer instruction ROM 121. The busy terminal is connected by way of line 36 to chip 18. The EXT terminal is connected by way of line 35 to chip 18 and to ROM 121. The IDLE terminal is connected by way of line 34 to chip 18 and ROM 121. The IRG terminal is connected by way of line 32 to chip 18 and ROM 121. The $V_{SS}$ terminal which, for the example here described is nominally 0 volts, is connected to the output terminal 125 of a power supply 126 by way of conductor 21. Conductor 21 connects to the $V_{ss}$ terminal on chip 18 and to ROM 121.

Power supply 126 supplies the $V_{GG}$ voltage at terminal 2 and the $V_{DD}$ terminal voltage at terminal 7. Terminal 2 is connected by way of line 40 to chip 18 and to ROM 121. Terminal 7 is connected by way of line 39 to chip 18 and ROM 121.

Power supply 126 includes a regulator 129 for control of the output voltages. Power supply 126 provides an output plug 130 which connects the power input terminal of the associated calculator when placed in the cradle of FIGS. 4–6. A receptacle 130a is also provided as a charging terminal for batteries in the associated calculator, thus providing an auxiliary function not involved in actual use of the calculator.

The terminals $\bar{A}$, A, B and $\bar{B}$ of chip 18 are connected by way of lines 133 to the motor drive circuit 134. Motor power is supplied from output terminals A, $\bar{A}$ and B, $\bar{B}$. In the embodiment of the invention here described the motor 19 may be a four phase motor, typically such as manufactured and sold by North American Phillips Control Corporation of Chesaire, Connecticut, and identified as part number B82203-M4.

In operation, calculator 10 may be placed in the nest 107. Calculator 10 is provided with a plug to mate with the receptacle 108. Calculator 10 then may be operated in the conventional manner with instructions flowing to the calculator through terminal IRG in line 32 to chip 18 and ROM 121. Instructions decoded either by ROM 121 or ROM 122 then cause the ROM to provide chip 18 with the necessary instructions for operating the printer 21. In the embodiment described herein, alternate ROMs 121 or 122 are depicted to provide capability for cooperation with more than one type of calculator. Specifically ROM 121 provides capability for co-acting with calculators known commercially as SR-51 or SR-52. While ROM 122 provides for co-acting with the calculator such as designated by SR-56 and similar units. A switch 150 is provided to select which ROM is to be used.

Now turning to the functional operation of the calculator/cradle system, the circuits can operate in any of three individual modes. The first of these is a print mode where any number in the display at the time is printed out by the printer cradle when the print key is executed. The basic SCOM transfers program control to the ROM 121 in the print cradle which then initiates a program routine causes the number to be printed out by the thermal printer. The second mode is when the trace key is on. Any function key that is executed causes the number in the display at that time to be printed out, as well as the alphanumeric designation of that function key.

When the function key is pressed, control is transferred from the main SCOM/ROM system to the print ROM 121 in the print cradle. A routine is executed which causes the number in the display register and the code for function key to be sent to the printer chip 18. Once this data is sent, a print command is executed which prints this information on one line of the thermal paper. While the print is in progress, any attempted further operation of the print chip 18 will cause a "busy" signal to be transferred back to the arithmetic chip. The system is free however to go on with any calculation not requiring a print operation. When the results of the previously described function key execution have been obtained, control is once again transferred to the print ROM 121. If the printer is now clear (non busy) then the results of the function key execution will be printed in the same manner as before.

The third mode is the list mode which is used when operating with a programmable calculator. The list command causes the SCOM chip to sequence through the memory locations starting with address zero or any other specified address and prints the location code and the key code of each memory location. Each one is printed separately on one line so that you have a list of all the program locations and the associated key designation stored therein.

An additional feature of the invention is a printhead protection circuit. This circuit is utilized to prevent burning out of the printhead due to a voltage being applied thereto for an excessively long time due to some mode failure within the printer logic and drive circuits. In FIG. 3c a diode array 161 is interconnected with the column drive circuit 120. Diode array 161 effectively ORs together all of the outputs of the column drives (circuits 120). The output of this OR circuit is represented by terminal 2 of the printer and logic drive circuit block shown in FIG. 2c. This output goes to the power supply and connects to the power shutdown circuit 160.

In operation, when a print command is given, one or more of the column drive circuits is energized. Ths energization of any of the column circuit puts a voltage on terminal 2. This voltage charges the capacitor 63 through resistor 162. As long as the column drive is on the normal length of time for one printing operation, capacitor 163 will charge up to a potential below that required to fire zenor diode 166. Upon removal of the column drive potential, between printing cycles, capacitor 163 will discharge through resistor 164. However, in the event that anyone column drive potential remains on the printhead for excessively length of time, the voltage on capacitor 163 will charge to a level greater than that which is required to fire the zenor diode 166 thereby triggering SCR 165. When SCR 165 is triggered it effectively shorts the gate voltage on power supply SCR CR3 to ground or at least to a sufficiently low voltage to turn CR3 off thereby shutting down the output power from the power supply. When the power supply is shutdown, power is removed from the thermal printhead therby preventing the printhead from being destroyed by power being applied thereto for an extensive length of time.

Having described the invention in connection with certain specific embodiments thereof, it is to be understood that further modifications may now suggest themselves to those skilled in the art and it is intended to cover such modifications as fall within the scope of the appended claims.

What is claimed is:

1. A printing calculator system which comprises:
 a. a portable electric calculator implemented on at least one integrated circuit semiconductor chip with entry means therein for entering both data and functions and for outputting data and instructions,
 b. a cradle including a printer for receiving said calculator in a nest therein with a set of contacts in said nest for connecting the calculator to the cradle when in said nest, and
 c. means including at least one integrated circuit semiconductor chip in said cradle to receive data for actuating said printer in response to the entering of data and functions at said entry means.

2. A system for printing information generated by a hand-held calculator having a keyboard for entering data and arithmetic functions, said system comprising:
 a. a cradle structure for receiving said calculator in a nest therein, said structure including a printing mechanism and means to supply paper to said printing mechanism,
 b. a multiterminal plug in said nest adapted to mate with a multicircuit fixture in the bottom of said calculator, and
 c. at least one integrated circuit semiconductor chip interconnecting said printing mechanism and said fixture for responding to instructions and data flowing through said fixture to said at least one chip with a selective actuation of said printing mechanism in response to operation of said keyboard.

3. In a printing calculator system embodied in a desk console unit, the combination which comprises:
 a. a printer module mounted within said unit and having a thermal printhead, paper feeding means, and printer control means for generating printer commands to said printhead and said paper feeding means;
 b. paper supply sensor means electrically connected to a power source and said printer control means for automatically disabling said printer control means when said paper feeding means becomes devoid of paper;
 c. a portable, hand-held electronic calculator removably inserted within said unit, and having visual display means and entry means for entering data and functions; and
 d. means interposed between said calculator and said printer module for exchanging control signals between said calculator and said module and for controlling said printer to print out data and functions entered at said entry means in response to the entry of said data and functions at said entry means.

4. The combination set forth in claim 3 wherein said printer control means is implemented on an integrated circuit chip.

5. The combination set forth in claim 3 wherein said calculator is implemented on at least one integrated circuit semiconductor chip.

6. The combination set forth in claim 3 wherein said means for exchanging control signals and for controlling said printer module includes a multichannel plug in the bottom of said calculator and a mating multichannel plug in said unit in electrical connection with said printer module.

7. The combination set forth in claim 6 wherein said means for exchanging control signals and for controlling said printer module includes at least one integrated circuit semiconductor chip providing logic and memory.

8. A printing calculator system, which comprises;
 a. a printer module having a thermal printhead, paper feeding means, and printer control means for generating printer commands to said printhead and said paper feeding means;
 b. a portable, hand-held electronic calculator having visual display means, entry means for entering data and functions, and a multichannel calculator plug;
 c. a desk-top printer cradle with said printer module embodied therein, and having a portion at which said calculator may be received;
 d. a multichannel cradle plug mounted at said portion to electrically mate with said calculator plug;
 e. power supply means mounted within said cradle and in electrical communication with said printer module and said cradle plug;
 f. means interposed between said cradle plug and said printer module for exchanging control signals between said calculator and said module, and for receiving data from said calculator for printing by said module in response to operation of said entry means; and
 g. switching means electrically connected to said power source and said printer control means for selectively enabling or disabling said printhead when said printer module is not in use, and for automatically disabling said printer control means when said paper feeding means is devoid of paper.

9. The combination set forth in claim 8 wherein said printer control means is implemented on an integrated circuit chip.

10. The combination set forth in claim 8 wherein said calculator is implemented on at least one integrated circuit semiconductor chip.

* * * * *